US012394546B2

(12) United States Patent
Choe et al.

(10) Patent No.: US 12,394,546 B2
(45) Date of Patent: Aug. 19, 2025

(54) METHOD FOR PRODUCING MAGNET POWDER AND SINTERED MAGNET PRODUCED BY THE SAME

(71) Applicant: LG Chem, Ltd., Seoul (KR)

(72) Inventors: Jinhyeok Choe, Daejeon (KR); Soon Jae Kwon, Daejeon (KR); Hyounsoo Uh, Daejeon (KR); Kwang Won Jeon, Daejeon (KR); Seung Ho Moon, Yuseong-gu Daejeon (KR); Jakyu Chun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 889 days.

(21) Appl. No.: 17/616,518

(22) PCT Filed: Jul. 6, 2020

(86) PCT No.: PCT/KR2020/008768
§ 371 (c)(1),
(2) Date: Dec. 3, 2021

(87) PCT Pub. No.: WO2021/025301
PCT Pub. Date: Feb. 11, 2021

(65) Prior Publication Data
US 2022/0238264 A1 Jul. 28, 2022

(30) Foreign Application Priority Data
Aug. 2, 2019 (KR) ........................ 10-2019-0094474

(51) Int. Cl.
*H01F 1/057* (2006.01)

(52) U.S. Cl.
CPC ......... *H01F 1/0573* (2013.01); *H01F 1/0572* (2013.01); *H01F 1/0577* (2013.01)

(58) Field of Classification Search
None
See application file for complete search history.

(56) References Cited

U.S. PATENT DOCUMENTS

| | | |
|---|---|---|
| 4,869,964 A | 9/1989 | Mazany |
| 4,876,305 A | 10/1989 | Mazany |

(Continued)

FOREIGN PATENT DOCUMENTS

| | | | |
|---|---|---|---|
| CN | 106328367 A | 1/2017 |
| EP | 0320861 A2 | 6/1989 |

(Continued)

OTHER PUBLICATIONS

Machine translation of JPH0246702A. (Year: 1990).*

(Continued)

*Primary Examiner* — Xiaowei Su
(74) *Attorney, Agent, or Firm* — Lerner David LLP

(57) ABSTRACT

A method for producing a magnet powder is provided in the present disclosure. The method includes synthesizing a R—Fe—B-based magnet powder by a reduction-diffusion process, coating an antioxidant film onto a surface of the R—Fe—B-based magnet powder, and immersing and cleaning the R—F—B-based magnet powder in an aqueous solvent or a non-aqueous solvent, wherein R is Nd, Pr, Dy or Tb, and wherein the antioxidant film includes a compound containing at least one amino group.

7 Claims, 1 Drawing Sheet

(56) References Cited

U.S. PATENT DOCUMENTS

| | | | |
|---|---|---|---|
| 5,395,695 | A | 3/1995 | Shain et al. |
| 6,149,861 | A | 11/2000 | Kaneko et al. |
| 2002/0144754 | A1 | 10/2002 | Tokoro et al. |
| 2011/0171583 | A1 | 7/2011 | Zhang et al. |
| 2015/0233006 | A1 | 8/2015 | Kuribayashi et al. |
| 2018/0044810 | A1 | 2/2018 | Kuribayashi et al. |
| 2018/0061568 | A1 | 3/2018 | Yu et al. |
| 2018/0130581 | A1 | 5/2018 | Fujikawa et al. |
| 2020/0199718 | A1 | 6/2020 | Shin et al. |

FOREIGN PATENT DOCUMENTS

| | | | | |
|---|---|---|---|---|
| EP | 0561445 | A1 | | 9/1993 |
| EP | 3276645 | A1 | | 1/2018 |
| JP | H0246702 | A | * | 2/1990 |
| JP | H02162703 | A | | 6/1990 |
| JP | H06124816 | A | | 5/1994 |
| JP | H6248307 | A | | 9/1994 |
| JP | H0765083 | A | | 3/1995 |
| JP | H11329811 | A | | 11/1999 |
| JP | 2000199074 | A | | 7/2000 |
| JP | 2000223306 | A | | 8/2000 |
| JP | 2003217914 | A | | 7/2003 |
| JP | 2004043979 | A | | 2/2004 |
| JP | 2011114335 | A | | 6/2011 |
| JP | 2013001985 | A | | 1/2013 |
| JP | 201383001 | A | | 5/2013 |
| JP | 2013149664 | A | | 8/2013 |
| JP | 2016139705 | A | | 8/2016 |
| JP | 2018082145 | A | | 5/2018 |
| JP | 2020532135 | A | | 11/2020 |
| KR | 20070103339 | A | | 10/2007 |
| KR | 20150098196 | A | | 8/2015 |
| KR | 20190035010 | A | | 4/2019 |
| KR | 20190042371 | A | | 4/2019 |
| KR | 20190053611 | A | | 5/2019 |
| WO | 2019107926 | A2 | | 6/2019 |

OTHER PUBLICATIONS

Machine translation of KR20190042371A. Apr. 24, 2019. (Year: 2019).*

International Search Report for Application No. PCT/KR2020/008768, dated Oct. 28, 2020, 2 pages.

Extended European Search Report including Written Opinion for Application No. 20851114.7 dated Jul. 8, 2022, pp. 1-8.

Search Report dated Dec. 26, 2023 from the Office Action for Chinese Application No. 202080040755.8 issued Dec. 28, 2023, pp. 1-2.

* cited by examiner

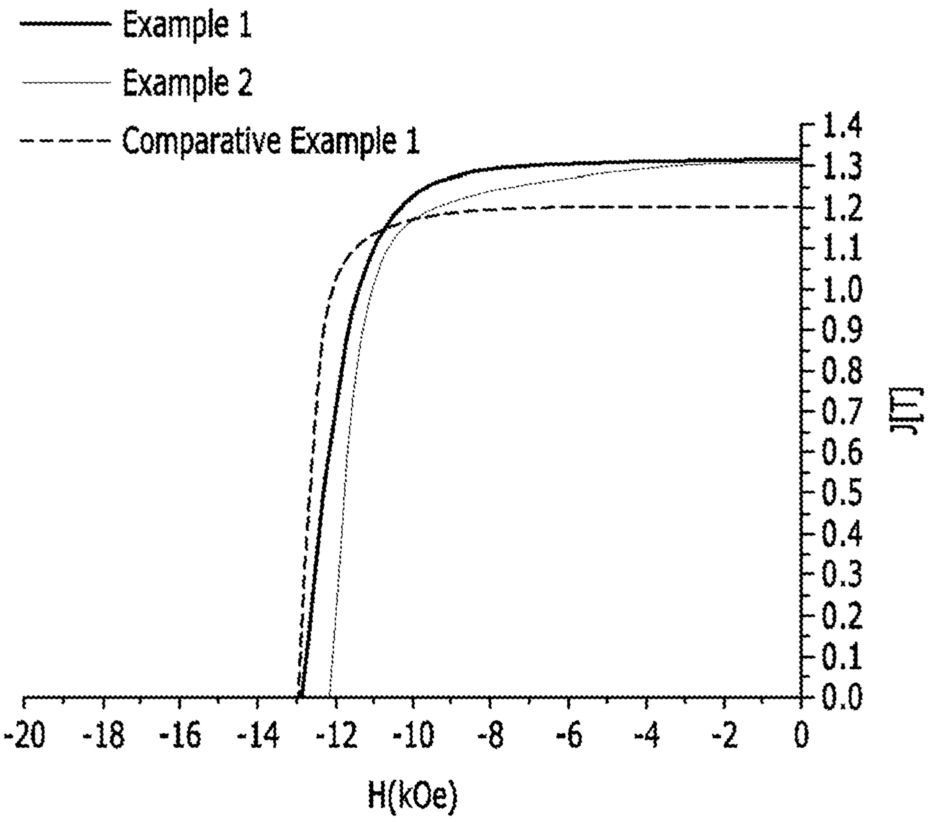
Example 1
Example 2
Comparative Example 1
1.4
1.3
1.2
1.1
1.0
0.9
0.8
0.7
0.6
0.5
0.4
0.3
0.2
0.1
0.0
J[T]
-20
-18
-16
-14
-12
-10
-8
-6
-4
-2
0
H(kOe)

METHOD FOR PRODUCING MAGNET POWDER AND SINTERED MAGNET PRODUCED BY THE SAME

CROSS-REFERENCE TO RELATED APPLICATION(S)

This application is a national stage entry under 35 U.S.C. § 371 of International Application No. PCT/KR 2020/008768 filed on Jul. 6, 2020, which claims priority from Korean Patent Application No. 10-2019-0094474 filed on Aug. 2, 2019 with the Korean Intellectual Property Office, the disclosures of which are incorporated herein by reference in their entirety.

TECHNICAL FIELD

The present disclosure relates to a method for producing a magnet powder and a sintered magnet produced by the same. More specifically, it relates to a method of producing a magnet powder containing a rare earth element, and a sintered magnet produced by sintering the magnet powder produced by this method.

BACKGROUND ART

NdFeB-based magnets are permanent magnets having a composition of $Nd_2Fe_{14}B$ which is a compound of neodymium (Nd), a rare earth element, and iron and boron (B), and have been used as general-purpose permanent magnets for 30 years since there are developed in 1983. The NdFeB-based magnets are used in various fields such as electronic information, automobile industry, medical equipment, energy, and transportation. In particular, in line with recent trends in weight reduction and miniaturization, they are used in products such as machine tools, electronic information devices, electronic products for home appliances, mobile phones, robot motors, wind power generators, small motors for automobiles, and driving motors.

For the general preparation of NdFeB-based magnets, a strip/mold casting or melt spinning method based on a metal powder metallurgy method is known. First, the strip/mold casting method is a process in which metals such as neodymium (Nd), iron (Fe), boron (B) are melted by heating to produce an ingot, crystal grain particles are coarsely pulverized and subjected to a refinement process to produce microparticles. These steps are repeated to obtain a magnet powder, which is subjected to a pressing and sintering process under a magnetic field to produce an anisotropic sintered magnet.

In addition, the melt spinning method is a process in which metal elements are melted, then poured into a wheel rotating at a high speed, rapidly cooled, pulverized by a jet mill, then blended with a polymer to form a bonded magnet, or pressed to produce a magnet.

However, all of these methods have problems that a pulverization process is essentially needed, it takes a long time in the pulverization process, and a process of coating the surface of the powder after pulverization is needed.

Recently, attention has been paid to the method of producing a magnet powder by a reduction-diffusion process. However, in the case of production using this process, by-products such as calcium oxide (CaO) remain in the magnet powder particles, and thus, a cleaning process for removing them is essentially needed.

However, in such a cleaning process, the magnet powder particles may be oxidized to form an oxide film on the surface. When the sintered magnet is produced thereafter, the oxide film not only hinders the sintering of the magnet powder, but also promotes columnar decomposition, which causes deterioration of the physical properties of the sintered magnet.

DETAILED DESCRIPTION OF THE INVENTION

Technical Problem

Embodiments of the present disclosure has been designed to solve that above-mentioned problems, and an object of the present disclosure is to provide a method for producing a magnet powder that can prevent oxidation and columnar decomposition of powder particles, and a sintered magnet produced by sintering the magnet powder produced by this method.

However, the problem to be solved by embodiments of the present disclosure is not limited to the above-described problems, and can be variously expanded within the scope of the technical idea included in the present disclosure.

Technical Solution

A method for producing a magnet powder according to an embodiment of the present disclosure includes: a synthesis step of synthesizing a R—Fe—B-based magnet powder by a reduction-diffusion process; a coating step of coating an antioxidant film onto a surface of the R—Fe—B-based magnet powder; and a cleaning step of immersing and cleaning the R—Fe—B-based magnet powder in an aqueous solvent or a non-aqueous solvent, wherein R is Nd, Pr, Dy or Tb, and wherein the antioxidant film includes a compound containing at least one amino group.

The compound may include ethylene diamine.

The compound may include 2-ethylhexyloxy propyl amine.

The compound may include at least one of tris(2-aminoethyl)amine or 1,2-diaminopropane.

The synthesis step may include a step of mixing rare earth oxide, boron and iron to prepare a primary mixture, a step of adding a reducing agent to the primary mixture to prepare a secondary mixture, and a step of heating the secondary mixture to a temperature of 800 to 1100 degrees Celsius, wherein the reducing agent may include at least one of Ca, $CaH_2$ or Mg.

At least one of $NH_4NO_3$, $NH_4Cl$ or ethylenediaminetetraacetic acid (EDTA) may be dissolved in the aqueous solvent or the non-aqueous solvent.

The aqueous solvent may include deionized water, and the non-aqueous solvent may include at least one of methanol, ethanol, acetone, acetonitrile, or tetrahydrofuran.

The R—Fe—B-based magnet powder may include NdFeB-based magnet powder.

The cleaning step may be repeated two or more times.

The sintered magnet according to one embodiment of the present disclosure is a sintered magnet produced by sintering the magnet powder produced by the above method, which may have an oxygen content of 2000 ppm to 3000 ppm.

The sintered magnet may have a residual magnetization of 1.3 to 1.36 T (Tesla).

The sintered magnet may include a $Nd_2Fe_{14}B$-based sintered magnet.

Advantageous Effects

According to the embodiments of the present disclosure, an antioxidant film can be formed on the R—Fe—B-based magnet powder synthesized by the reduction-diffusion process, thereby preventing an oxidation and columnar decomposition of the powder particles, and such magnet powder can be sintered to produce a sintered magnet with improved residual magnetization.

BRIEF DESCRIPTION OF THE DRAWINGS

The FIG. 1*s* a B—H measurement graph for each of the sintered magnets in Example 1, Example 2, and Comparative Example 1.

DETAILED DESCRIPTION OF THE EMBODIMENTS

Hereinafter, various embodiments of the present disclosure will be described in detail so that those skilled in the art can easily implement them. The present disclosure may be modified in various different ways, and is not limited to the embodiments set forth herein.

Further, throughout the specification, when a portion is referred to as "including" a certain component, it means that it can further include other components, without excluding the other components, unless otherwise stated.

The method for producing a magnet powder according to some embodiments of the present disclosure may be a method of producing an R—Fe—B-based magnet powder. Further, the method for producing the magnet powder of the present embodiment may be a method for producing the $Nd_2Fe_{14}B$-based magnet powder.

The method for producing a magnet powder according to one embodiment of the present disclosure includes: a synthesis step of synthesizing a R—Fe—B-based magnet powder by a reduction-diffusion process; a coating step of coating an antioxidant film onto a surface of the R—Fe—B-based magnet powder; and a cleaning step of immersing and cleaning the R—Fe—B-based magnet powder in an aqueous solvent or a non-aqueous solvent. In this case, the antioxidant film includes a compound containing at least one amino group ($NH_2$).

The R refers to a rare earth element, and may be Nd, Pr, Dy, or Tb. In other words, R described hereinafter means Nd, Pr, Dy or Tb.

Then, in the following, the method will be described in more detail for each step.

First, the synthesis step of synthesizing a R—Fe—B-based magnet powder by a reduction-diffusion process will be described.

The synthesis step may include a step of mixing rare earth oxide, boron and iron to prepare a primary mixture, a step of adding a reducing agent to the primary mixture to prepare a secondary mixture, and a step of heating the secondary mixture to a temperature of 800 to 1100 degrees Celsius. The reducing agent may include at least one of Ca, $CaH_2$ or Mg.

The synthesis is a method of mixing raw materials such as rare earth oxide, boron, and iron, and reducing and diffusing the raw materials at a temperature of 800 to 1100 degrees Celsius to form a R—Fe—B type alloy magnet powder.

Specifically, when preparing a powder from a mixture of rare earth oxide, boron and iron, the molar ratio of the rare earth oxide, boron and iron may be between 1:14:1 and 1.5:14:1. The rare earth oxide, boron and iron may be raw materials for producing a $R_2Fe_{14}B$ magnet powder, and when the above molar ratio is satisfied, the $R_2Fe_{14}B$ magnet powder can be produced in a high yield. When the molar ratio is less than 1:14:1, there is a problem that the $R_2Fe_{14}B$ columnar structure is distorted and the R-rich phase is not formed in grain boundaries, and when the molar ratio is 1.5:14:1 or more, there may be a problem that the amount of the rare earth element is excessive and the reduced rare earth element remains, and the remaining rare earth element is changed to $R(OH)_3$ or $RH_2$.

The heating is for synthesis and may be performed at a temperature of 800 to 1100 degrees Celsius for 10 minutes to 6 hours under an inert gas atmosphere. When the heating time is 10 minutes or less, the powder is not sufficiently synthesized, and when the heating time is 6 hours or more, there may be a problem that the size of the powder becomes coarse and primary particles are aggregated.

The magnet powder thus produced may be $R_2Fe_{14}B$. Further, the size of the produced magnet powder may be 0.5 to 10 micrometers. Further, the size of the magnet powder produced according to one embodiment may be 0.5 to 5 micrometers.

In other words, $R_2Fe_{14}B$ magnet powder is formed by heating at a temperature of 800 to 1100 degrees Celsius, and the $R_2Fe_{14}B$ magnet powder is a neodymium magnet and exhibits excellent magnetic properties.

Usually, in order to form $R_2Fe_{14}B$ magnet powder such as $Nd_2Fe_{14}B$, the raw materials are melted at a high temperature of 1500 to 2000 degrees Celsius, and then rapidly cooled to form lumps of raw materials, and these lumps are subjected to coarse pulverization, hydrogen crushing and the like to obtain a $R_2Fe_{14}B$ magnet powder.

However, such a method requires a high temperature for melting the raw materials, and also requires a process that must cool it again, followed by pulverization, so that the process time is long and complicated. Further, in order to enhance the corrosion resistance and improve the electrical resistance for the coarsely pulverized $R_2Fe_{14}B$ magnet powder, a separate surface treatment process is required.

However, when a R—Fe—B magnet powder is produced by a reduction-diffusion process as in the present embodiment, the raw materials are reduced and diffused at a temperature of 800 degrees to 1100 degrees Celsius to form a $R_2Fe_{14}B$ magnet powder. In this step, since the size of the magnet powder is formed in units of several micrometers, a separate pulverization step is not required.

Further, subsequently, in the case of the step of obtaining a sintered magnet by sintering the magnet powder, sintering in the temperature range of 1000 to 1100 degrees Celsius essentially involves the growth of crystal grains, but the growth of these crystal grains acts as a factor that reduces a coercive force. The size of the crystal grains of the sintered magnet is directly related to the size of the initial magnet powder, and thus, if the average size of the magnet powder is controlled from 0.5 to 10 micrometers as in the magnet powder according to one embodiment of the present disclosure, a sintered magnet having improved coercive force can be produced subsequently.

Further, it is possible to adjust the size of the alloy powder produced by adjusting the size of the iron powder used as a raw material.

However, when a magnet powder is produced by such reduction-diffusion process, by-products such as calcium oxide and magnesium oxide may be formed during the production process, and a cleaning step for removing them is required.

In order to remove these by-products, a cleaning step of immersing and cleaning the produced magnet powder in an aqueous solvent or a non-aqueous solvent is followed. This cleaning may be repeated two or more times.

The aqueous solvent may include deionized water (DI water), and the non-aqueous solvent may include at least one of methanol, ethanol, acetone, acetonitrile, or tetrahydrofuran.

Meanwhile, in order to remove by-products, ammonium salt or acid may be dissolved in an aqueous solvent or a non-aqueous solvent, and specifically, at least one of $NH_4NO_3$, $NH_4C_1$, or ethylenediaminetetraacetic acid (EDTA) may be dissolved.

When the ammonium salt or acid as above is added to a non-aqueous solvent, the existing aqueous cleaning step is avoided, the ammonium salt is dissolved in a non-aqueous solvent and induced so as to react efficiently with the reduced by-products, whereby the powder particles can be cleaned without contacting water. Therefore, it is possible to more efficiently prevent oxidation of the produced magnet powder particles.

However, in the case of not only aqueous solvents but also non-aqueous solvents, dissolved ammonium salt or acid can be reacted with calcium oxide by-products to produce water, as shown in the following Reaction Schemes.

$$CaO+2NH_4NO_3 \rightarrow Ca(NO_3)_2+2NH_3(gas)+H_2O$$

【Reaction Scheme 1】

$$CaO+2NH_4Cl \rightarrow CaCl_2+2NH_3(gas)+H_2O$$

【Reaction Scheme 2】

Both when an aqueous solvent is used and when a non-aqueous solvent is used, the magnet powder particles are easily exposed to water or oxygen, and finally oxidized on the surface to form an oxide film. Such an oxide film makes sintering of the magnet powder difficult, promotes columnar decomposition, which causes deterioration of the physical properties of the permanent magnet as mentioned above.

Therefore, the method for producing the magnet powder in the present embodiment includes a coating step of coating an antioxidant film onto a surface of the R—Fe—B-based magnet powder, and the antioxidant film contains a compound containing at least one amino group.

Specifically, the coating step is preferably performed before the cleaning step, and the R—Fe—B-based magnet powder and the compound are added to a solvent, and then mixed concurrently with pulverizing through a Ball-Mill, a Turbula mixer, a Spex mill, a stirring, and a homogenizer or the like, so that an antioxidant film containing the compound can be coated onto the surface of the R—Fe—B-based magnet powder.

However, in the present embodiment, the coating method as above is one of several methods of forming an antioxidant film, and the method of forming the antioxidant film can be variously extended without any particular limitation.

The compound containing at least one amino group may include, specifically, at least one of ethylene diamine, 2-ethylhexyloxy propyl amine, tris(2-aminoethyl)amine or 1,2-diaminopropane, or particularly preferably, include at least one of ethylene diamine or 2-ethylhexyloxy propyl amine.

The structural formula of ethylene diamine is as shown in the following structural formula 1.

[Structural Formula 1]

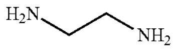

The structural formula of 2-ethylhexyloxy propyl amine is as shown in the following structural formula 2.

(Structural Formula 2)

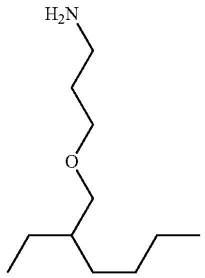

The structural formula of tris(2-aminoethyl)amine is as shown in the following structural formula 3.

[Structural Formula 3]

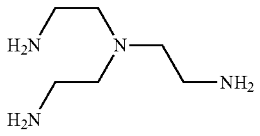

The structural formula of 1,2-diaminopropane is as shown in the following structural formula 4.

[Structural Formula 4]

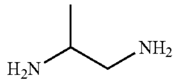

The amino group (—$NH_2$) possessed by the above compounds has a stronger bonding force with rare earth elements compared to the hydroxy group (—OH), and thus, when the surface of R—Fe—B magnet powder is coated with a compound containing at least one amino group as described above, it is possible to prevent the R—Fe—B-based magnet powder from being oxidized. In particular, ethylene diamine has a larger crystal field splitting size on the spectrochemical series than the hydroxy group, and thus, when ethylene diamine coating is performed, it is effective in preventing oxidation on the surface of the magnet powder and reducing the oxygen content of the magnet powder.

Therefore, the oxygen content in the R—Fe—B-based magnet powder can be lowered, and since the oxygen content is reduced, it is possible to prevent columnar decomposition of R—Fe—B-based magnet powder. Further, the sintered magnet produced by sintering such magnet powder may also have a low oxygen content and may improve a residual magnetization. This will be described again below.

Meanwhile, when a sintered magnet is produced by sintering a magnet powder, the oxide film formed on the surface by oxidization of the magnet powder particles may act as a factor that hinders the progress of sintering. At this time, if the antioxidant film is formed as in the present embodiment, it is possible to prevent an oxide film from being formed on the surface of the magnet powder, and sintering proceeds efficiently, which is useful for producing high-density sintered magnets.

In the following, a step of producing a sintered magnet by sintering the magnet powder produced according to the above-mentioned method for producing the magnet powder, and a sintered magnet produced by the same will be described.

R—Fe—B-based magnet powder and rare earth hydride powder can be mixed to produce a mixed powder. The rare earth hydride powder is preferably mixed in an amount of 3 to 15% by mass relative to the mixed powder.

When the content of the rare earth hydride powder is less than 3% by mass, there may be problems that sintering is not fully performed because sufficient wettability between particles is not imparted, and it does not sufficiently perform the role of suppressing the columnar decomposition of R—Fe—B. Further, when the content of the rare earth hydride powder exceeds 15% by mass, there may be problems that in the sintered magnet, the volume ratio of the R—Fe—B column is reduced, the residual magnetization value is reduced, and the particles grow excessively due to liquid phase sintering. When the size of the crystal grains increases due to the overgrowth of the particles, it is vulnerable to magnetization reversal and thus, the coercive force is reduced.

Next, the mixed powder is heat-treated at a temperature of 700 to 900 degrees Celsius. In this step, the rare earth hydride is separated into rare earth metal and hydrogen gas, and hydrogen gas is removed. That is, as an example, when the rare earth hydride powder is $NdH_2$, $NdH_2$ is separated into Nd and $H_2$ gas, and $H_2$ gas is removed. That is, the heat treatment at 700 to 900 degrees Celsius is a step of removing hydrogen from the mixed powder. At this time, the heat treatment may be performed in a vacuum atmosphere.

Next, the heat-treated mixed powder is sintered at a temperature of 1000 to 1100 degrees Celsius. At this time, the step of sintering the heat-treated mixed powder at a temperature of 1000 to 1100 degrees Celsius may be performed for 30 minutes to 4 hours. This sintering step can also be performed in a vacuum atmosphere. More specifically, the heat-treated mixed powder can be placed in a graphite mold, compressed, and oriented by applying a pulsed magnetic field to produce a molded body for a sintered magnet. The molded body for a sintered magnet is heat-treated at a temperature of 300 to 400 degrees Celsius under a vacuum atmosphere, and then heated to a temperature of 1000 to 1100 degrees Celsius to produce a sintered magnet.

In the sintering step, liquid phase sintering by rare earth elements is induced. That is, liquid phase sintering by the rare earth element occurs between the R—Fe—B-based magnet powder produced by a conventional reduction-diffusion process and the added rare earth hydride powder. Thereby, R-rich and ROx phases are formed in the grain boundary area inside the sintered magnet or in the grain boundary area of the columnar grains of the sintered magnet.

The thus formed R-rich area or ROx phase improves the sintering property of the magnet powder and prevents decomposition of the columnar particles in the sintering process for producing a sintered magnet. Therefore, the sintered magnet can be stably produced.

The produced sintered magnet has a high density, and the size of crystal grains may be 1 to 10 micrometers. The sintered magnet produced by the above method is an R—Fe—B-based sintered magnet and has an oxygen content of 2000 ppm to 3000 ppm.

The R refers to a rare earth element, and is Nd, Pr, Dy or Tb. At this time, the sintered magnet may be an NdFeB-based sintered magnet, more preferably an $Nd_2Fe_{14}B$-based sintered magnet.

As mentioned above, the magnet powder in the present embodiment is a magnet powder produced by the reduction-diffusion process, which is a magnet powder that has been immersed and cleaned in an aqueous solvent or a non-aqueous solvent to remove by-products generated during the reduction-diffusion process. The magnet powder that has undergone such a cleaning step is easily exposed to water or oxygen, and is oxidized on the surface of the magnet powder to form an oxide film. Details are omitted as they overlap with the above-mentioned contents.

Therefore, in the magnet powder according to the present embodiment, an antioxidant film including a compound containing at least one amino group is formed on the surface thereof.

Ethylene diamine, 2-ethylhexyloxy propyl amine, tris(2-aminoethyl)amine and 1,2-diaminopropane are compounds containing one or more amino groups (—$NH_2$), and it has a stronger binding force with a rare earth element than a hydroxy group (—OH), thereby being able to prevent the R—Fe—B-based magnet powder from being oxidized.

That is, by forming the above-mentioned antioxidant film on the surface, even the sintered magnet obtained by sintering the magnet powder subjected to the reduction-diffusion process, particularly the cleaning step, can maintain the oxygen content as low as 2000 ppm to 3000 ppm.

Further, it is possible to prevent the columnar decomposition of the sintered magnet, which may lead to improvement of residual magnetization. Therefore, the sintered magnet in the present embodiment may have a residual magnetization of 1.3 to 1.36 T (Tesla).

Further, it is possible to prevent the oxide film from being formed on the surface of the magnet powder through the antioxidant film, so that it is possible to produce a sintered magnet having a higher density than when sintering is performed.

The oxygen content refers to a value of the mass of the oxygen element relative to the mass of the sintered magnet, and can be measured through the ONH836 Analyzer.

Specifically, first, a blank test is performed, and then a standard value is measured two or more times. 0.1 g of the sample is taken into a tin capsule and fully rolled to remove air. Subsequently, the crucible of the ONH836 Analyzer is removed, the upper and lower electrodes are wiped off, and then the Tin Capsule containing the sample is placed in a Nickel Basket and injected into the ONH836 Analyzer to measure ONH. This measurement is repeated two to three times to calculate the average value.

Meanwhile, in the present disclosure, a Ball-Mill, a Turbula mixer, a Spex mill, and the like can be used for mixing or pulverizing each component.

Then, in the following, the method for producing a magnet powder according to an exemplary embodiment of the present disclosure, and the sintered magnet produced by sintering the magnet powder produced by the present method will be described with reference to specific examples and comparative examples.

Example 1: Formation of an Antioxidant Film Using Ethylene Diamine 21.94 g of $Nd_2O_3$, 0.659 g of B, 39.98 g of Fe and 11.76 g pf Ca were uniformly mixed with 0.17 g of Cu and 0.25 g of Al to prepare a mixture.

The mixture was placed in an arbitrarily shaped frame and tapped, and allowed to react in a tube electric furnace at 950° C. for 30 minutes to 6 hours under an inert gas (Ar, He) atmosphere. After completion of the reaction, in order to form an antioxidant film on the surface of the molded product with pulverization, 10 ml of ethylene diamine was added thereto, and a ball mill step was performed with zirconia balls under a dimethyl sulfoxide solvent.

Next, a cleaning step was performed to remove Ca and CaO, which are reduction by-products. 30 g to 35 g of $NH_4NO_3$ was uniformly mixed with the synthesized powder, then immersed in ~200 ml of methanol, and homogenizer and ultrasonic cleaning was repeated once or twice alternately for effective cleaning. Then, in order to remove $Ca(NO)_3$, a reaction product of residual CaO and $NH_4NO_3$ with the same amount of methanol, it was rinsed with methanol or deionized water 2~3 times. Finally, after rinsing with acetone, vacuum drying was performed to finish cleaning, and thereby, single-phase $Nd_2Fe_{14}B$ powder particles were obtained.

Subsequently, 5% by mass of $NdH_2$ was added to the magnet powder and mixed, and then placed in a graphite mold and compression-molded. The powder was oriented by applying a pulsed magnetic field of 5 T or more to prepare a molded body for a sintered magnet. Thereafter, the molded body was heat-treated in a vacuum sintering furnace at a temperature of 350 degrees Celsius for 1 hour, and heated and sintered at a temperature of 1040 degrees Celsius for 2 hours to produce a sintered magnet.

Example 2: Formation of an Antioxidant Film Using 2-Ethylhexyloxy Propyl Amine

A mixture was prepared in the same manner as in Example 1, and then heat-treated at the same temperature. In order to form an antioxidant film, a ball mill step was performed with zirconia balls in 2 ml of 2-ethylhexyloxypropyl amine and dimethyl sulfoxide or hexane solvent. Next, after cleaning was performed in the same manner as in Example 1, $Nd_2Fe_{14}B$ powder particles were obtained. Subsequently, sintering was performed in the same manner as in Example 1 to produce a sintered magnet.

Comparative Example 1: No Coating 3.2679 g of $Nd_2O_3$, 0.1000 g of B, 7.2316 g of Fe, and 1.75159 g of Ca were uniformly mixed with metal fluoride ($CaF_2$, $CuF_2$) and 0.1376 g of Mg. Metal fluoride controls the particle size and size of the particles.

The mixture was placed in an arbitrarily shaped frame and tapped, and then allowed to react in a tube electric furnace at 950° C. for 30 minutes to 6 hours under an inert gas (Ar, He) atmosphere. After completion of the reaction, the molded product was subjected to hydrogen occlusion under an $H_2$ gas atmosphere to induce particle separation, and then ground with mortar to make powder. Next, a cleaning process was performed to remove Ca and CaO, reduction by-products. 6.5 g to 7.0 g of $NH_4NO_3$ was uniformly mixed with the synthesized powder, immersed in ~200 ml of methanol, and homogenizer and ultrasonic cleaning was repeated once or twice alternately for effective cleaning. Then, in order to remove $Ca(NO)_3$, a reaction product of residual CaO and $NH_4NO_3$, with the same amount of methanol, it was repeated about 2 times until clear methanol was obtained. Finally, after rinsing with acetone, vacuum drying was performed to finish cleaning, and thereby single-phase $Nd_2Fe_{14}B$ powder particles were obtained. Subsequently, sintering was performed in the same manner as in Example 1 to produce a sintered magnet.

Evaluation Example 1: Measurement of Oxygen Concentration

The oxygen concentrations were measured and analyzed for each of the sintered magnets of Example 1, Example 2, and Comparative Example 1 through the ONH836 Analyzer, and are shown in Table 1 below.

Specifically, a blank test was performed, and then the standard value was measured two or more times. 0.1 g of each sample was taken into a tin capsule and fully rolled to remove air. Thereafter, the crucible of the ONH836 Analyzer was removed, the upper and lower electrodes were wiped off, and then the Tin Capsule containing the sample was placed in a Nickel Basket and injected into the ONH836 Analyzer to measure ONH.

This measurement was repeated 2 to 3 times for each of the sintered magnets of Example 1, Example 2 and Comparative Example 1 to calculate the average value. These average values are shown in Table 1 below.

TABLE 1

| | Oxygen content (ppm) | Oxygen content (mass %) |
|---|---|---|
| Example 1 | 2500 | 0.25 |
| Example 2 | 2700 | 0.27 |
| Comparative Example 1 | 4870 | 0.487 |

Referring to Table 1, it can be confirmed that the magnet powder of Example 1 and the sintered magnet of Example 2 have an oxygen content of 2000 ppm to 3000 ppm, which is lower than that of the sintered magnet of Comparative Example 1. That is, although the magnet powder was formed by a reduction-diffusion process including a cleaning step, it can be confirmed that since an antioxidant film containing ethylene diamine or 2-ethylhexyloxy propyl amine is formed, oxidation of the magnet powder is prevented, and the oxygen content of the sintered magnet that has been sintered is also reduced.

Evaluation Example 2: Measurement of Coercive Force and Residual Magnetization

The coercive force and residual magnetization were measured for each of the sintered magnets of Example 1, Example 2, and Comparative Example 1, and shown in the FIGURE, and the residual magnetization values are shown in Table 2 below.

TABLE 2

| | Residual magnetization (T) |
|---|---|
| Example 1 | 1.320 |
| Example 2 | 1.313 |
| Comparative Example 1 | 1.207 |

Referring to the FIGURE and Table 2, the sintered magnets sintered with the magnet powders of Example 1 and Example 2 showed residual magnetization values of 1.320 T and 1.313 T, respectively, whereas the sintered magnet sintered with the magnet powder of Comparative Example 1 showed a residual magnetization value of about 1.207 T. That is, the sintered magnets sintered with the magnet powder of Examples 1 and 2 showed higher residual magnetization values than the magnet powder sintered with the magnet powder of Comparative Example 1. In the case of Example 1, an antioxidant film containing ethylene diamine was formed, and in the case of Example 2, an antioxidant film containing 2-ethylhexyloxy propyl amine was formed.

As a result, the sintering is performed more smoothly without columnar decomposition of the magnet powder or the sintered magnet.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A method for producing a magnet powder comprising:

synthesizing a R—Fe—B-based magnet powder by a reduction-diffusion process;

coating an antioxidant film onto a surface of the R—Fe—B-based magnet powder; and immersing and cleaning the R—Fe—B-based magnet powder in an aqueous solvent or a non-aqueous solvent, and wherein coating the antioxidant film onto the surface of the R—Fe—B-based magnet powder is performed before immersing and cleaning the R—Fe—B-based magnet powder, wherein R is Nd, Pr, Dy or Tb, wherein the antioxidant film includes a compound containing at least one amino group, and wherein the compound includes at least one selected from the group consisting of ethylene diamine and 2-ethylhexyloxy propyl amine.

2. The method according to claim 1, wherein the compound further includes at least one selected from the group consisting of tris(2-aminoethyl)amine and 1,2-diaminopropane.

3. The method according to claim 1, wherein synthesizing the R—Fe—B-based magnet powder includes mixing rare earth oxide, boron and iron to prepare a primary mixture, adding a reducing agent to the primary mixture to prepare a secondary mixture, and heating the secondary mixture to a temperature of 800 to 1100 degrees Celsius, and the reducing agent includes at least one selected from the group consisting of Ca, $CaH_2$ and Mg.

4. The method according to claim 1, wherein at least one selected from the group consisting of $NH_4NO_3$, $NH_4Cl$ and ethylenediaminetetraacetic acid (EDTA) is dissolved in the aqueous solvent or the non-aqueous solvent.

5. The method according to claim 1, wherein the aqueous solvent includes deionized water, and the non-aqueous solvent includes at least one selected from the group consisting of methanol, ethanol, acetone, acetonitrile, and tetrahydrofuran.

6. The method according to claim 1, wherein the R—Fe—B-based magnet powder includes NdFeB-based magnet powder.

7. The method according to claim 1, wherein cleaning the R—Fe—B-based magnet powder is repeated two or more times.

* * * * *